United States Patent
Lebeault et al.

(10) Patent No.: US 11,661,860 B2
(45) Date of Patent: May 30, 2023

(54) COMPRESSOR MODULE FOR TURBOMACHINE

(71) Applicant: SAFRAN AIRCRAFT ENGINES, Paris (FR)

(72) Inventors: Eva Julie Lebeault, Moissy-Cramayel (FR); Laurent Soulat, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/785,212

(22) PCT Filed: Dec. 18, 2020

(86) PCT No.: PCT/EP2020/086933
§ 371 (c)(1),
(2) Date: Jun. 14, 2022

(87) PCT Pub. No.: WO2021/123098
PCT Pub. Date: Jun. 24, 2021

(65) Prior Publication Data
US 2022/0381153 A1    Dec. 1, 2022

(30) Foreign Application Priority Data

Dec. 18, 2019  (FR) ..................................... 1914728

(51) Int. Cl.
*F01D 17/16*    (2006.01)
*F04D 29/56*    (2006.01)

(52) U.S. Cl.
CPC ........... *F01D 17/16* (2013.01); *F04D 29/563* (2013.01); *F05D 2220/30* (2013.01); *F05D 2240/128* (2013.01); *F05D 2260/60* (2013.01)

(58) Field of Classification Search
CPC .......... F01D 5/146; F01D 17/14; F01D 17/16; F01D 17/162; F05D 2240/128; F05D 2240/129
See application file for complete search history.

(56) References Cited

U.S. PATENT DOCUMENTS 9,249,736 B2 * 2/2016 Carroll ................... F04D 29/563
9,494,053 B2 * 11/2016 Orosa .................... F01D 17/143
(Continued)

FOREIGN PATENT DOCUMENTS

EP    43452 A  *  1/1982  ........... F01D 17/162
EP    3361058 A1    8/2018
(Continued)

OTHER PUBLICATIONS

International Search Report for PCT/EP2020/086933 dated Mar. 15, 2021.
Written Opinion for PCT/EP2020/086933 dated Mar. 15, 2021.

*Primary Examiner* — Courtney D Heinle
*Assistant Examiner* — Danielle M. Christensen
(74) *Attorney, Agent, or Firm* — Sandberg Phoenix & von Gontard, PC

(57) ABSTRACT

A turbomachine compressor module comprising an annular array of struts provided with pivotable flaps. The struts can define inter-strut spaces between two circumferentially adjacent struts, and variably oriented stator vanes are disposed at least partially in the inter-strut spaces. Also, a turbomachine having such a module and a row of rotor blades directly downstream of the module.

9 Claims, 4 Drawing Sheets

(56) References Cited

U.S. PATENT DOCUMENTS

Figure 1:
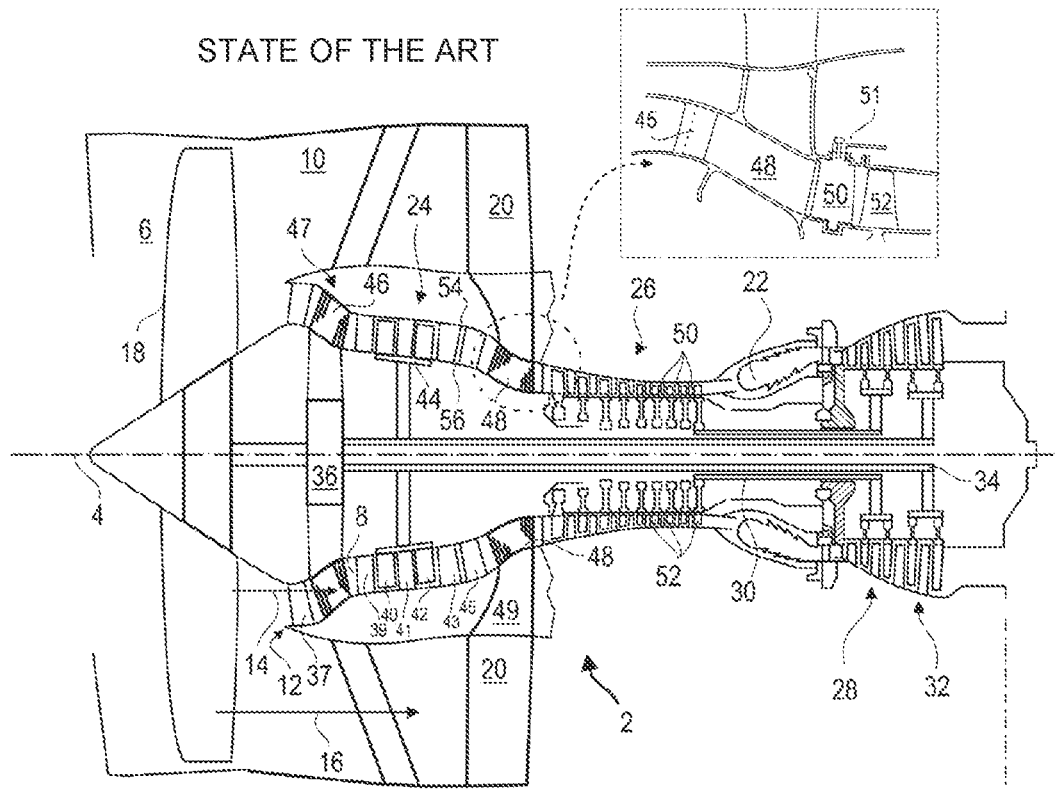

| | | |
|---|---|---|
| 10,174,763 B1 | 1/2019 | Orosa et al. |
| 2006/0275110 A1 | 12/2006 | Baralon |
| 2013/0259672 A1 | 10/2013 | Suciu et al. |
| 2016/0061054 A1 | 3/2016 | Nolcheff |
| 2019/0186501 A1* | 6/2019 | Kalitzin .................. F01D 5/147 |
| 2021/0172373 A1* | 6/2021 | Anand .................. F01D 17/162 |

FOREIGN PATENT DOCUMENTS

| | | | |
|---|---|---|---|
| FR | 2595117 A1 | 9/1987 | |
| GB | 2405184 A * | 2/2005 | ........... B64C 11/001 |

* cited by examiner

COMPRESSOR MODULE FOR TURBOMACHINE

The present invention is the US national stage under 35 U.S.C. § 371 of International Application No. PCT/EP2020/086933 which was filed on Dec. 18, 2020, and which claims the priority of application FR1914728 filed on Dec. 18, 2019 the contents of which (text, drawings and claims) are incorporated here by reference in its entirety.

FIELD

The invention relates to an assembly for a turbomachine. More specifically, the invention relates to a compressor casing module comprising radial struts and stator vanes.

BACKGROUND

An axial turbomachine compressor casing may comprise a structural section consisting essentially of an outer ring, a central hub and structural arms, commonly referred to as "struts", extending primarily radially between the hub and the ring. The structural casing forms a supporting structure for the turbine engine. It is usually in the form of a one-piece casting and it may delimit a goose-neck-like airflow passage.

Upstream and downstream of the goose-neck passage are generally positioned two annular rows of stator vanes.

An example of such a structural casing is described in FR 3 027 053 A1.

A large gap remains between the struts and the row of stator vanes directly downstream of the struts. This gap is a source of pressure drop as the flow in the wake of the struts is not ideally controlled to properly meet the leading edge of the stator vanes. There is therefore an opportunity to improve the performance of the compressor.

SUMMARY

The objective of the invention is to eliminate any pressure drop at the interface between the structural struts and the row of stator vanes directly downstream of these struts and thus improve the performance of the compressor.

The invention relates to a turbomachine compressor module, comprising: a substantially axisymmetric central hub; an outer ring, coaxial with the central hub; and an annular row of struts extending from the central hub to the outer ring, remarkable in that each strut has a fixed upstream portion and a pivotable downstream flap.

The integration (in the sense of "positioning") of a vane deflecting the flow in the struts makes it possible to avoid the pressure losses identified above in known compressors. These losses are moreover influenced by the dimensioning of the struts which often receive servitudes such as oil or fuel pipes or cabling or possibly a radial transmission shaft.

According to various embodiments of the invention, the module comprises an annular row of variably oriented stator vanes extending from the central hub to the outer ring, the struts defining inter-strut spaces between two circumferentially adjacent struts and the stator vanes being disposed at least partially in the inter-strut spaces. The incorporation of axially overlapping stator vanes between the struts further allows for the advancement of the entire stator vane row and thus reduces the overall length of the turbomachine. This makes the turbomachine more compact and lighter.

According to an exemplary advantageous embodiment of the invention, the upstream portion has a cavity that is open towards the downstream side and that forms a portion of a cylinder, the flap being received in said cavity. Such an arrangement allows continuity of the air guiding surface and therefore limits pressure losses at the fixed portion/flap interface.

According to an exemplary advantageous embodiment of the invention, the annular row of stator vanes is a first row, and the module further comprises a second annular row of stator vanes arranged in the inter-strut spaces and axially distant from the first row of vanes. The positioning in the inter-strut space of the rows of vanes initially upstream and downstream of the struts further improves the compactness and weight of the turbomachine.

According to an exemplary advantageous embodiment of the invention, the upstream portion of each strut is symmetrical with respect to an axis parallel to the hub axis. This geometry has the advantage of being neutral for a flow which has no tangential component upstream of the struts.

According to an exemplary advantageous embodiment of the invention, the vanes and flaps have respective trailing edges that share a common axial position. In other words, the flaps and stator vanes, or at least their downstream ends, are axially aligned. This arrangement allows a circumferentially homogeneous flow.

According to an exemplary advantageous embodiment of the invention, the central hub comprises a radially external airflow guide surface whose orientation in line with the flaps forms an angle with the axis of symmetry of the central hub which is between 0° and 10°. Such an inclination of the air guiding surface is sufficiently small to limit the load losses on the internal portion of the vanes and flaps which can deviate from the guiding surface in some of their angular positions.

According to an exemplary advantageous embodiment of the invention, the flaps have a respective cross-section that is substantially identical to the cross-section of the vanes. By "cross-section" is meant here the profile in a cross-sectional plane, for example a plane perpendicular to the trailing edge at a given point of the trailing edge. The flow is thus more homogeneous at the outlet of the module.

According to an exemplary advantageous embodiment of the invention, a common actuation mechanism controls the orientation of the vanes and the pivoting motion of the flaps. This solution simplifies the actuation of the flaps and vanes. Alternatively, two independent mechanisms can be arranged to orient the stator vanes or some of the vanes in one orientation and to orient the flaps in another orientation.

In various embodiments, the invention also relates to a turbomachine comprising a low-pressure compressor and/or a high-pressure compressor, provided with a module according to one of the above-described embodiments, the turbomachine comprising a row of rotor blades directly downstream of the module.

Thus, pressure drops between the structural struts and the row of stator vanes directly downstream of the struts are eliminated.

DRAWINGS

Figure 2:
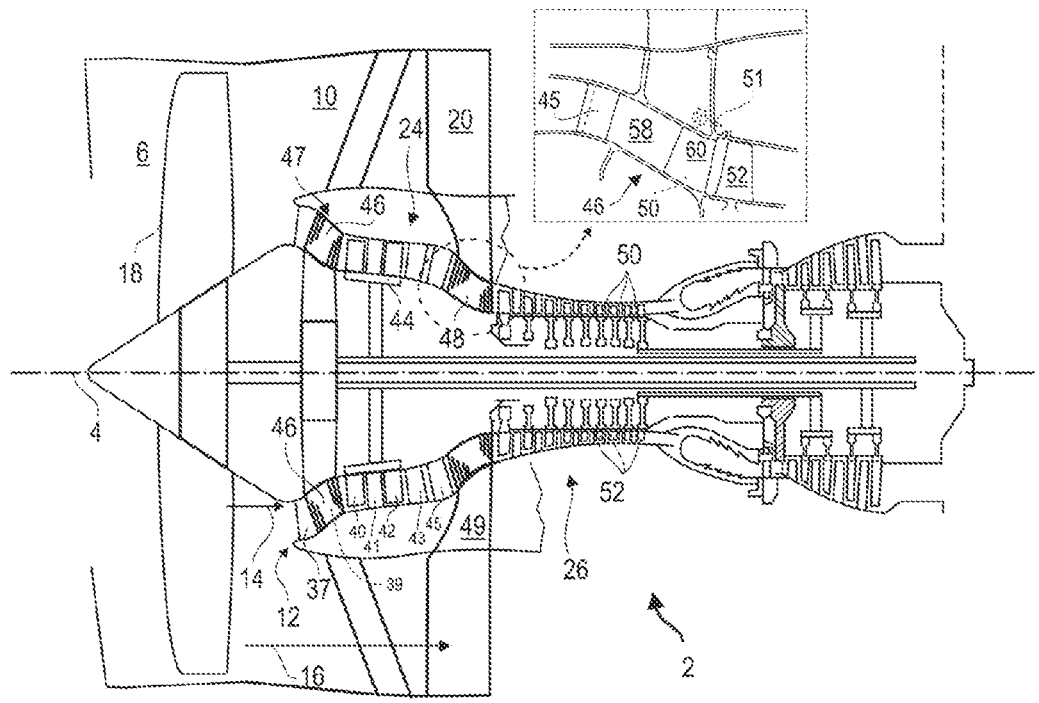

FIG. 1 shows a turbomachine according to the state of the art;

FIG. 2 exemplarily shows an axial turbomachine according to various embodiments of the invention.

Figure 3:
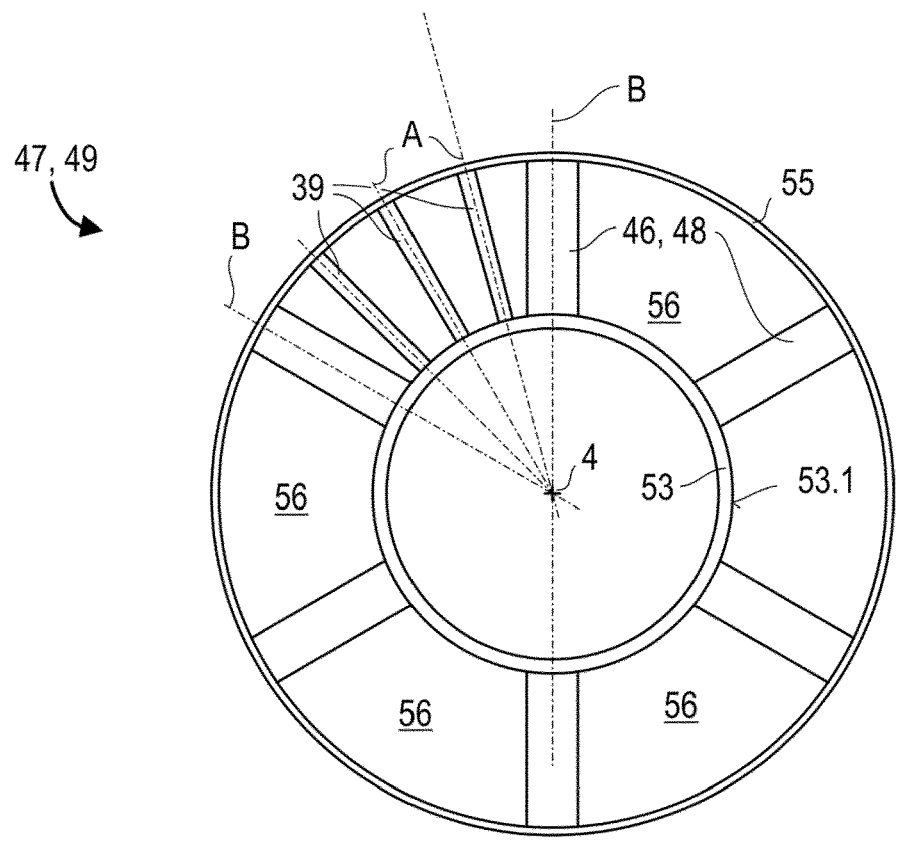

FIG. 3 exemplarily sketches the compressor module according to various embodiments of the invention in a section that is perpendicular to the axis of the turbomachine.

Figure 4:
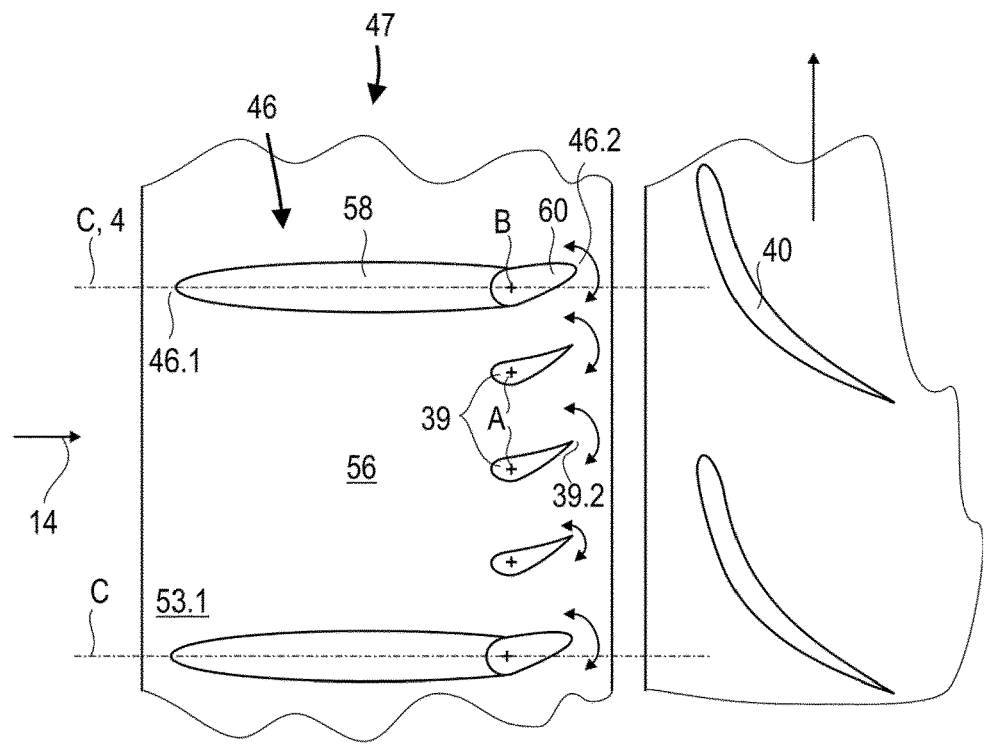

FIG. 4 exemplarily illustrates a partial view of the module according to various embodiments of the invention, seen radially from the outside.

FIGS. 5A-6B exemplarily show two alternatives of the structural struts according to various embodiments of the invention.

Figure 7:
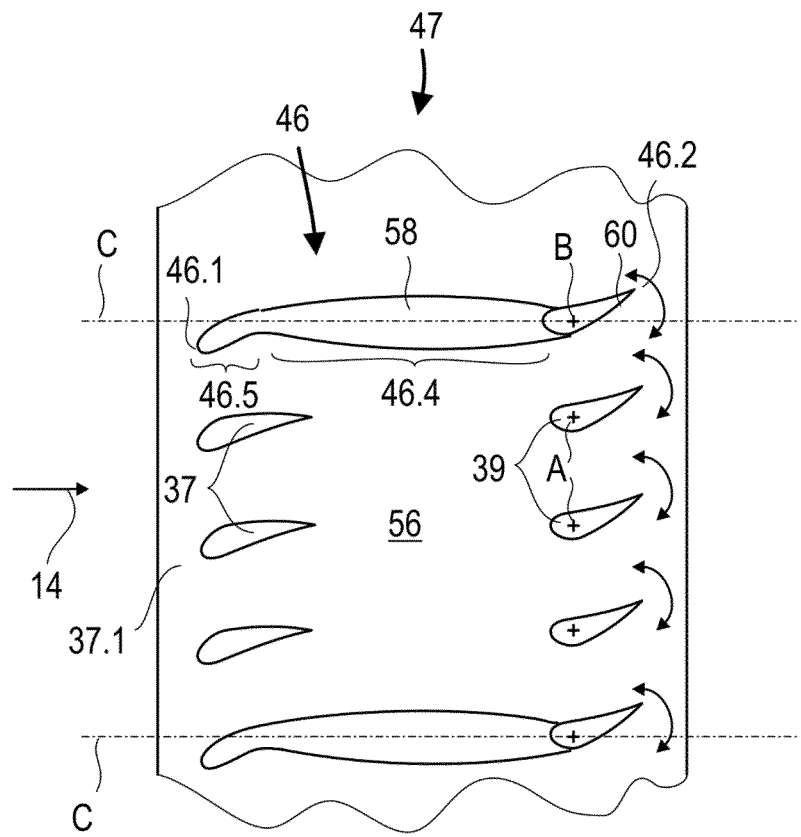

FIG. 7 exemplarily shows a partial view of the module according to various other embodiments of the invention, seen radially from the outside.

Figure 8:
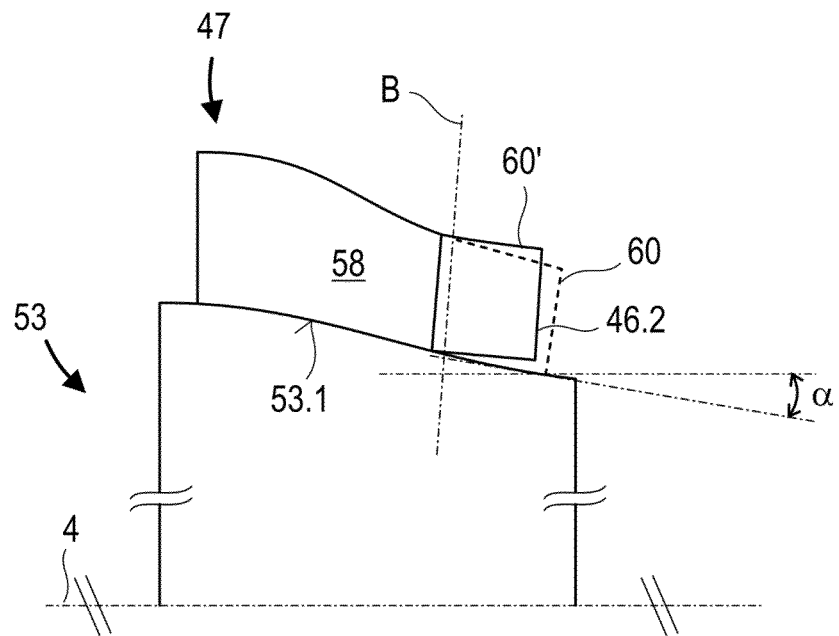

FIG. 8 exemplarily shows a partial view of the module, seen laterally, showing it in its radial extent, in a longitudinal cross-section according to various embodiments of the invention.

DETAILED DESCRIPTION

In the following description, the terms "internal" and "external" refer to a position with respect to the axis of rotation of a turbomachine. The axial direction is the direction along the axis of rotation of the turbomachine that coincides with the axisymmetric axis of the hub of the casing module. The radial direction is perpendicular to the axis of rotation. Upstream and downstream refer to the main flow direction of the flow in the turbomachine. The term "integral" is to be understood as integral in rotation.

FIG. 1 is simplified representation of an axial turbomachine of the prior art. This is a dual-flow turbojet engine 2.

The turbomachine 2 has an axis of rotation 4. An annular inlet 6 divides into a primary flow path 8 and a secondary flow path 10 by means of a circular separation nozzle 12. A primary flow 14 and a secondary flow 16 pass through these streams 8 and 10 respectively, and meet at the outlet of the turbomachine 2. The primary flow 14 and the secondary flow 16 are coaxial annular flows and are fitted into each other. They are channeled by the internal and external walls of the turbomachine 2.

The secondary flow 16 is accelerated by a fan 18 arranged at the inlet 6, in order to generate thrust for the flight of an aircraft. Straightening blades 20 may be arranged in the secondary flow path 10 and may be configured to increase the axial component of the secondary flow velocity vector. The fan 18 is arranged upstream of the primary duct 8 and the secondary duct 10.

The turbomachine 2 comprises a compression zone formed by two compressors 24, 26, a combustion chamber 22 and an expansion zone 28, 32. The compressors 24, 26 consist of a low-pressure compressor 24 and a high-pressure compressor 26.

The high-pressure compressor 26 may be located at the inlet of the combustor 22.

Downstream of the combustor 22, the turbomachine 2 may have a high-pressure turbine 28 coupled to a high-pressure shaft 30, and then a low-pressure turbine 32 coupled to a low-pressure shaft 34. The latter may be rotationally independent of the high-pressure shaft 30. These turbines 28, 32 may form the expansion zone of the primary flow 14.

In operation, the mechanical power received by the turbines 28, 32 is transmitted to the shafts 30, 34 which set the compressors 24, 26 in motion. The compressors have several rows of rotor blades associated with rows of stator vanes. The rotor blades are driven by the shafts 30, 34 about the axis of rotation 4 to generate a flow of air and progressively compress it to the inlet of the combustion chamber 22.

The turbomachine may include gearing means, such as a gearbox 36 which drives the fan 18 at a lower speed than the rotor blades. The low-pressure compressor 24 or booster is referred to here as "fast". With the gearbox 36, only two turbines are needed to drive the compressors and the blower at three different speeds each.

In this example, the low-pressure compressor 24 comprises two rows of rotor blades 40, 42 which are connected to the shaft 34 via a rotor 44.

The compressor 24 includes stator vanes 39, 41 interposed between the rotor blades 40, 42.

The compressor 24 may comprise alternating stator vanes and rotor blades, or as in the illustrated example, two successive rows of stator vanes 43, 45 in its downstream portion. The set of stator vanes 39, 41, 43, 45 forms the rectifier 35 of the compressor 24.

The stator of the turbomachine 2 may comprise a plurality of support casing modules, including an upstream module 47 and a downstream module 49 arranged on either side of the compressor 24. These modules 47, 49 may comprise annular sleeves forming sections of the primary duct 8 and may have struts 46, 48 extending radially through the duct 8. The annular sleeves may have gooseneck profiles. They can mark significant reductions in the diameter of the primary duct 8.

The upstream module 47 and its struts 46 can support the gearbox 36.

Upstream of the struts 46 is a row of stator vanes 37 near the nozzle 12.

Downstream of the struts 48 is the high-pressure compressor 26 with stator vanes 50 and rotor blades 52. The latter are driven in rotation by means of the shaft 30.

In general, rows of stator vanes are arranged directly upstream and downstream of the struts 46, 48, so that the air flows through the inter-strut spaces with a velocity vector without a tangential component. These rows may or may not be rows of variable stator vanes, i.e., their orientation about a substantially radial axis is adjustable. These vanes are supported by an outer and inner shroud downstream or upstream of the structural casings 47, 49.

A portion of the upper right-hand side of FIG. 1 shows an enlarged view of the inlet of the high-pressure compressor 26. In particular, it shows the succession, in the direction of the air flow, of an annular row of struts 48, followed by an annular row of stator vanes 50 whose orientation is variable by means of a device 51. A row of rotor blades 52 is also shown downstream of the variable stator vanes 50 and is the most upstream rotor row of the high-pressure compressor 26.

FIG. 2 exemplarily shows a turbomachine according to various embodiments the invention.

This design differs from the turbomachine known in the prior art essentially in the design of the modules 47 and 49. Either or both of the structural modules 47, 49 can comprise structural struts 46, 48 having a fixed upstream portion 58 and a pivoting downstream portion or flap 60.

Optionally, and as described in FIG. 2, at least one row of stator vanes 37, 39, 45, 50 is arranged with an axial overlap of the structural struts 46, 48.

Thus, as can be seen from a comparison between the length of the turbomachine in FIG. 2 and FIG. 1 (see mixed line at bottom right of FIG. 1 and top right of FIG. 2), the integration of stator vanes into the module allows for a gain in the overall length of the turbomachine.

FIG. 2 shows the vanes 37 partially overlapping the struts 46 and the vanes 39 fully integrated between the struts 46. Alternatively, the vanes 39 can be only partially axially flush with the struts 46 and/or the vanes 37 can be upstream of the struts 46.

The same modifications can be made, in addition or alternatively, to the struts 48 of module 49. An inset in the enlarged view shows the variable stator vanes 50 at the inlet of the high-pressure compressor 26 (which are hidden by the strut 48). Thus, the rotor blades 52 can be placed directly downstream of the struts 48.

FIG. 3 exemplarily shows a view of module 47 or 49 in cross-section perpendicular to axis 4 in accordance with various embodiments of the invention. The module 47, 49 consists of the struts 46 or 48, the vanes 37, 39 or 45, a hub 53 and an outer ring 55. In the following description, reference numbers relating to module 47 will be used. The person skilled in the art will understand that the same teachings can be applied, alternatively or in combination, to module 49.

The struts 46 define, circumferentially between two adjacent struts 46, inter-strut spaces 56.

For clarity, only three vanes 39 are shown by way of example in FIG. 3 in an inter-strut space 56. Several and in various instances all inter-strut spaces 56 accommodate equal or different numbers of vanes 39, in various instances circumferentially evenly distributed.

The central hub 53 has an outer surface 53.1 which can be substantially conical. The outer surface 53.1 can also be curved, or can even have a point of inflection, so that the stream of air flowing through the module 47 resembles a "goose neck". The upstream diameter of the hub 53 is larger than its downstream diameter.

The struts 46 are in various instances evenly distributed angularly around the central hub 53. Alternatively, more struts 46 or struts of greater circumferential thickness can be provided at key positions, particularly for accommodating fluid lines.

The various parts of the module 47 can be joined together by welding, for example laser or electron beam welding.

The vanes integrated in the module 47 and in particular the vanes 39 can be rotatable about an axis A respective to each vane, which is shown here as being a radial axis. An actuation mechanism (not shown) that is common to all the vanes—for example a ring and a series of connecting rods—allows the vanes to be rotated about their axis A.

The vane orientation actuation mechanism can be, for example, the one illustrated in EP 3 361 058 A1. Several actuating mechanisms in the form of independent coaxial synchronising rings allow the vanes to be rotated to different angles.

The struts 46, 48 extend generally along a B-axis respective to each strut 46, 48. The B-axis is shown here as being radially and perpendicular to the axis 4.

FIG. 4 exemplarily illustrates a partial view of the module 47 along an axis B, viewed radially from the outside. The outer surface 53.1 of the hub and the inter-strut space 56, between two circumferentially adjacent struts 46, can be seen. Arrow 14 represents the general direction of flow which is substantially axial (parallel to axis 4) into or out of the compressor.

A portion of the rotor is shown on the right-hand side of FIG. 4 with the blades 40 and an arrow indicates the direction of rotation of the rotor.

The strut 46 has a leading edge 46.1 and a trailing edge 46.2.

In the inter-strut space 56 are arranged vanes 39. In this example, the vanes 39 are completely enclosed in this space 56. More particularly, the trailing edges 46.2 of the struts are axially aligned with the trailing edges 39.2 of the vanes 39. The trailing edges 39.2 and 46.2 are in various instances preferably identical.

Alternatively or in combination, vanes can be provided opposite the upstream portion 58 and can have a leading edge aligned with the leading edge 46.1 of the struts (see vanes 37 in FIG. 7).

Thanks to the integration of the vanes 39 in the inter-strut spaces, the airflow 14 can encounter rotor blades (see 40 or 52 in FIG. 1) directly downstream of the module 47.

The strut 46 is made up of a fixed upstream portion 58 and a pivotable downstream portion, or flap 60. The flap 60 pivots around the axis B, which is radial and passes through the strut 46. The pivoting motion of the flaps 60 can be controlled by the same actuating mechanism as the mechanism which orients the vanes 39.

The B axis can be at an axial position between 60% and 90% of the chord line of the struts.

The upstream portion 58 can be substantially symmetrical about an axis C parallel to the axis 4 of the turbomachine 2.

The flap 60 can have a profile (cross-section) that is identical to that of the vanes 39, in this cross-sectional view perpendicular to the B axis. Alternatively the profiles can be different.

The flap 60 extends no more than one third of the axial length of the strut 46.

The circumferential thickness of the vanes 39 is such that the vanes 39 occupy less than 20% of the circumferential span of the inter-strut space 56.

Figure 5A:
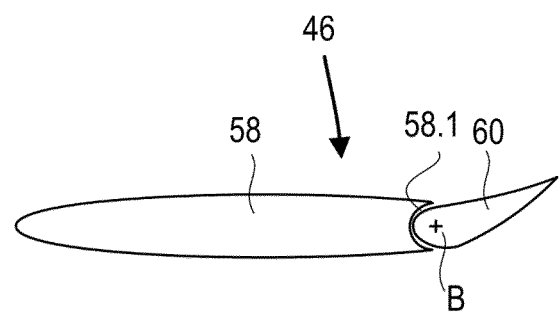
Figure 5B:
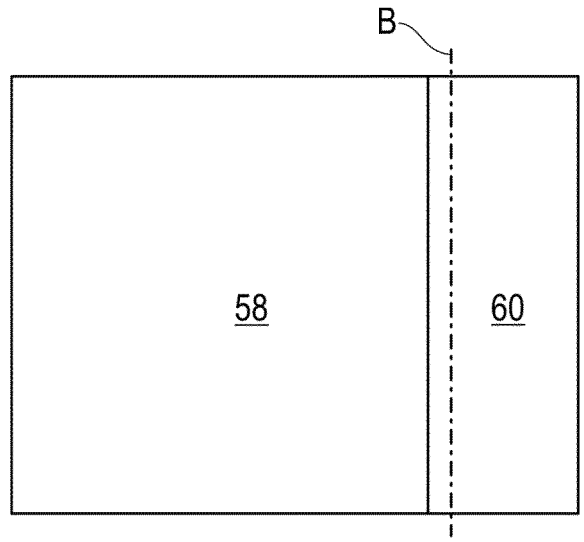

FIGS. 5A and 5B exemplarily show the fixed portion 58 and the flap 60 in a first embodiment. The fixed portion 58 has a cavity 58.1 which is shaped like a portion of a cylinder. The flap 60 has a complementary shape and is received in the cavity 58.1. The axis of the cylinder portion of the cavity 58.1 can coincide with the pivot axis B of the flap 60.

Such an arrangement provides continuity of the air guiding surface between the fixed portion 58 and the flap 60.

Figure 6A:
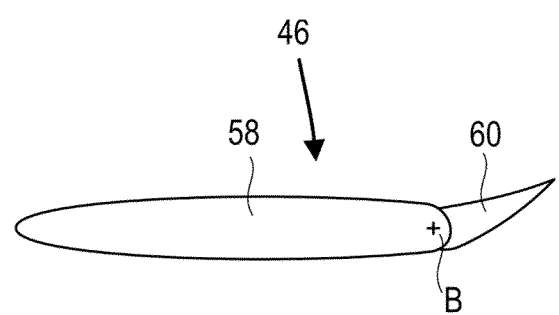
Figure 6B:
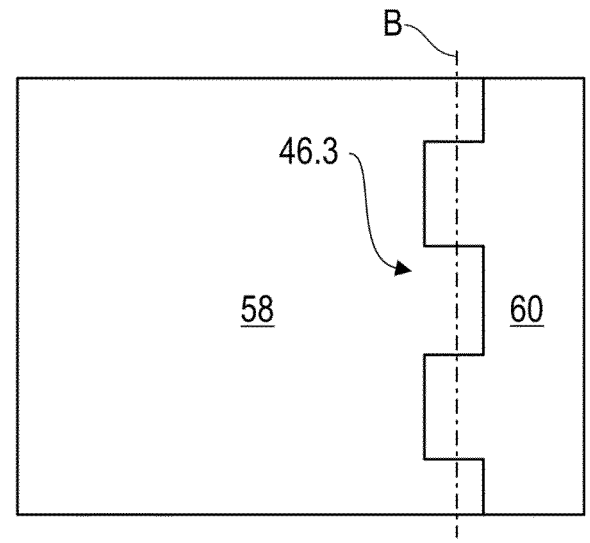

FIGS. 6A and 6B exemplarily show a second variant. In this example, a hinge 46.3 is used to connect the flap 60 to the fixed portion 58.

FIG. 7 exemplarily shows another example of the casing module 47.

A portion 46.4 of the strut is symmetrical with respect to the C-axis and an upstream portion 46.5 is asymmetrical with respect to the C-axis. The upstream portion 46.6 has in this example a profile which corresponds to that of the vanes 37 and therefore with a lower and an upper surface. The vanes 37 are here arranged completely in the inter-strut space 56.

If two rows of stator vanes 37, 39 are arranged in the inter-strut space 56, only one of the rows 39 is variable in orientation in this illustration.

FIG. 8 exemplarily shows a partial view of the module 47 in longitudinal section.

The hub 53 comprises a radially outer surface 53.1 which internally delimits the air stream (number 8 in FIG. 2). This surface 53.1 tends to approach the axis 4 in a downstream direction. The flap 60 is schematically represented in dotted line in a position where it forms a small angle with the axis 4 (the flow being not deflected or only slightly deflected tangentially). The solid line shows the flap 60' in another position, with a larger angle of orientation, thus deflecting the airflow.

In the position with a large angle, the radially inner point of the trailing edge 46.2 becomes clear of the surface 53.1. This clearance generates aerodynamic losses. The same problem arises with the vanes 39, which become free of the surface 53.1 in certain angular positions.

It is therefore necessary to provide an arrangement of the surface 53.1, the flaps 60 and the vanes 39 such that in line with the trailing edge 39.2, 46.2 (in all the orientation positions of the flaps 60 and the vanes 39), the surface 53.1 is not inclined by more than 10° in relation to the axis 4 of the turbomachine. This angular limit is materialised by the angle α in FIG. 8.

Alternatively, the hub 53 can have an external surface 53.1 which is not axisymmetric and which has substantially flat portions which "follow" the trajectory of the inner edge of the flaps 60. In this way, a constant clearance or permanent contact can be achieved between the flap 60 and the surface 53.1 for all orientations of the flap 60. The same design can be applied to the vanes 39 (in addition or alternatively to the flap).

It can also be seen in FIG. 8 that the axis B is not necessarily purely radial and can be, for example, normal to the surface 53.1. The same applies to the axis A for pivoting the vanes 39.

Indeed, in the examples illustrated in the preceding figures, the axes A and B are represented as being radial for convenience of representation and understanding of the concepts of the invention. Nevertheless, the invention cannot be limited to purely radial axes A and B and, in particular, an inclination with respect to axis 4 (as in FIG. 8) or an offset (axes A and/or B not passing through axis 4 in FIG. 3) are also possible.

The person skilled in the art will recognise that the different embodiments presented here can be combined and the teaching of one embodiment can be applied to all other embodiments.

Also, the examples illustrated herein show three vanes between two adjacent struts. Other numbers of vanes can be provided, especially when the struts are irregularly angularly spaced. Advantageously, a number of vanes between 3 and 10 is chosen in each inter-strut space.

What is claimed is:

1. A compressor module for a turbomachine, said module comprising:
    a central hub that is substantially axisymmetric around an axis of symmetry;
    an outer ring that is coaxial with the axis of symmetry;
    an annular row of struts extending from the central hub to the outer ring, each strut of the annular row of struts having a fixed upstream portion and a pivotable downstream flap, the struts of the annular row of struts defining inter-strut spaces between two circumferentially adjacent struts of the annular row of struts; and
    an annular row of variable stator vanes extending from the central hub to the outer ring, the variable stator vanes of the annular row of variable stator vanes being positioned at least partially in the inter-strut spaces.

2. The module according to claim 1, wherein the fixed upstream portion of each strut of the annular row of struts has a cavity that is open and has a shape of a portion of a cylinder, the respective flap of each strut of the annular row of struts being received in said cavity.

3. The module according to claim 1, wherein the annular row of stator vanes is a first row, and the module further comprises a second annular row of stator vanes arranged in the inter-strut spaces and axially distant from the first row.

4. The module according to claim 1, wherein the fixed upstream portion of each strut of the annular row of struts is symmetrical about an axis that is parallel to the axis of symmetry of the hub.

5. The module according to claim 1, wherein the variable stator vanes of the annular row of variable stator vanes and the flaps of the annular row of struts have respective trailing edges which share a same axial position.

6. The module according to claim 1, wherein the central hub comprises a radially outer airflow guiding surface whose orientation, at a location of the flaps, forms an angle with the axis of symmetry of the central hub which is between 0° and 10°.

7. The module according to claim 1, wherein the flaps and the variable stator vanes have respective cross-sections that are substantially identical.

8. The module according to claim 1, wherein a common actuating mechanism controls the orientation of the variable stator vanes and the pivoting motion of the flaps.

9. A turbomachine comprising a compressor provided with a module, the module comprising:
    a central hub that is substantially axisymmetric around an axis of symmetry;
    an outer ring that is coaxial with the axis of symmetry;
    an annular row of struts extending from the central hub to the outer ring, each strut of the annular row of struts having a fixed upstream portion and a pivotable downstream flap, the struts of the annular row of struts defining inter-strut spaces between two circumferentially adjacent struts of the annular row of struts; and
    an annular row of variable stator vanes extending from the central hub to the outer ring, the variable stator vanes of the annular row of variable stator vanes being positioned at least partially in the inter-strut spaces,
    the turbomachine further comprising a row of rotor blades arranged directly downstream of the module.

\* \* \* \* \*